US010375629B2

(12) United States Patent
Zhang

(10) Patent No.: US 10,375,629 B2
(45) Date of Patent: Aug. 6, 2019

(54) SERVICE PREFERENCES FOR MULTIPLE-CARRIER-ENABLED DEVICES

(71) Applicant: T-Mobile USA, Inc., Bellevue, WA (US)

(72) Inventor: Hongliang Zhang, Samammish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/137,813

(22) Filed: Dec. 20, 2013

(65) Prior Publication Data

US 2014/0187242 A1 Jul. 3, 2014

Related U.S. Application Data

(63) Continuation-in-part of application No. 13/732,111, filed on Dec. 31, 2012.

(60) Provisional application No. 61/911,047, filed on Dec. 3, 2013.

(51) Int. Cl.
*H04W 48/18* (2009.01)
*H04W 8/18* (2009.01)
*H04W 8/20* (2009.01)

(52) U.S. Cl.
CPC ............. *H04W 48/18* (2013.01); *H04W 8/18* (2013.01); *H04W 8/20* (2013.01)

(58) Field of Classification Search
CPC .................................................... H04W 48/18
See application file for complete search history.

(56) References Cited

U.S. PATENT DOCUMENTS

| 7,792,516 | B2 | 9/2010 | Soderstrom |
| 7,925,212 | B2 | 4/2011 | Eisenbach |
| 2003/0043773 | A1 | 3/2003 | Chang |
| 2004/0053632 | A1* | 3/2004 | Nikkelen .......... H04W 36/0066 455/522 |
| 2004/0092285 | A1 | 5/2004 | Kodim |
| 2004/0165597 | A1 | 8/2004 | Bicknell et al. |

(Continued)

FOREIGN PATENT DOCUMENTS

| CN | 1832442 | 9/2006 |
| CN | 101554070 | 10/2009 |

(Continued)

OTHER PUBLICATIONS

Office Action for U.S. Appl. No. 13/732,111, dated Nov. 4, 2014, Hongliang Zhang, "Intelligent Routing of Network Packets on Telecommunication Devices", 15 pages.

(Continued)

*Primary Examiner* — Rhonda L Murphy
(74) *Attorney, Agent, or Firm* — Lee & Hayes, P.C.

(57) ABSTRACT

Techniques are described herein for generating service preferences for a telecommunication device. Those service preferences are then provided to the telecommunication device to enable the telecommunication device to select a network connectivity from a plurality of network connectivities based at least in part on the service preferences. The network connectivities are respectively associated with a plurality of network operators. The service preferences may be generated and provided by any of a network operator, a service broker, or a management service.

22 Claims, 9 Drawing Sheets

(56) References Cited

U.S. PATENT DOCUMENTS

| | | |
|---|---|---|
| 2005/0070280 A1 | 3/2005 | Jung et al. |
| 2005/0164650 A1 | 7/2005 | Johnson |
| 2006/0268712 A1 | 11/2006 | Deen et al. |
| 2007/0019670 A1 | 1/2007 | Falardeau |
| 2007/0136473 A1 | 6/2007 | Birchler et al. |
| 2007/0286092 A1 | 12/2007 | Famolari et al. |
| 2008/0080411 A1 | 4/2008 | Cole |
| 2008/0253304 A1* | 10/2008 | Torabi ............... H04L 67/16 370/254 |
| 2008/0313351 A1* | 12/2008 | Mobasser ......... H04L 65/4076 709/241 |
| 2009/0005048 A1 | 1/2009 | Bae et al. |
| 2009/0245496 A1 | 10/2009 | Maione et al. |
| 2009/0324481 A1 | 12/2009 | Miller et al. |
| 2009/0325581 A1 | 12/2009 | Lu et al. |
| 2010/0095065 A1 | 4/2010 | Gray et al. |
| 2011/0130140 A1* | 6/2011 | Fadell ................ H04W 8/065 455/435.2 |
| 2011/0131338 A1 | 6/2011 | Hu |
| 2011/0319071 A1 | 12/2011 | Beppler et al. |
| 2011/0320588 A1 | 12/2011 | Raleigh |
| 2012/0163180 A1* | 6/2012 | Goel .................. H04L 45/30 370/238 |
| 2012/0166622 A1 | 6/2012 | Draznin et al. |
| 2012/0208496 A1 | 8/2012 | Raleigh |
| 2012/0224528 A1 | 9/2012 | Tapia et al. |
| 2012/0236739 A1 | 9/2012 | Wang |
| 2012/0238287 A1 | 9/2012 | Scherzer |
| 2012/0270504 A1 | 10/2012 | Zhang et al. |
| 2012/0322505 A1* | 12/2012 | Lodeweyckx ....... H04W 12/06 455/558 |
| 2013/0157711 A1 | 6/2013 | Lee et al. |
| 2013/0324087 A1* | 12/2013 | Zhong ................ H04W 12/06 455/411 |
| 2014/0003358 A1 | 1/2014 | Elliott |
| 2014/0086177 A1* | 3/2014 | Adjakple ........... H04W 12/08 370/329 |
| 2014/0172946 A1* | 6/2014 | Hershberg ......... H04L 67/2814 709/202 |
| 2014/0185519 A1 | 7/2014 | Zhang et al. |
| 2015/0373634 A1* | 12/2015 | Periyalwar ............ H04W 4/06 370/328 |
| 2017/0180245 A1 | 6/2017 | Zhang et al. |

FOREIGN PATENT DOCUMENTS

| | | |
|---|---|---|
| CN | 101562870 | 10/2009 |
| CN | 102665224 | 9/2012 |
| WO | WO2007015962 | 2/2007 |
| WO | WO2007070782 | 6/2007 |
| WO | WO2008045797 | 4/2008 |

OTHER PUBLICATIONS

Office Action for U.S. Appl. No. 13/732,111, dated Mar. 5, 2015, Hongliang Zhang, "Intelligent Routing of Network Packets on Telecommunication Devices", 17 pages.

PCT Search Report and Written Opinion dated Apr. 28, 2014 for PCT application No. PCT/US13/78030, 13 pages.

PCT Search Report and Written Opinion dated Mar. 11, 2014 for PCT application No. PCT/US13/71657, 13 pages.

Office action for U.S. Appl. No. 13/732,111, dated Jul. 17, 2015, Zhang et al., "Intelligent Routing of Network Packets on Telecommunication Devices", 19 pages.

Office action for U.S. Appl. No. 13/732,111, dated Dec. 31, 2015, Zhang et al., "Intelligent Routing of Network Packets on Telecommunication Devices", 19 pages.

Extended European Search Report dated May 18, 2016, for European patent application No. 13867293.6, 13 pages.

Extended European Search Report dated Jun. 23, 2016, for European Patent Application No. 13869568.9, 10 pages.

Final Office Action for U.S. Appl. No. 13/732,111, dated May 23, 2016, Hongliang Zhang, "Intelligent Routing of Network Packets on Telecommunication Devices", 19 pages.

Translated Chinese Office Action dated Aug. 1, 2017 for Chinese Patent Application No. 201380069499.5, a counterpart foreign application of U.S. Pat. No. 9,609,575, 30 pages.

Chinese Office Action dated Jan. 2, 2018 for Chinese patent application No. 201380069499.5, a counterpart foreign application of U.S. Pat. No. 9,609,575.

Chinese Office Action dated Jan. 29, 2018 for Chinese Patent Application No. 201380069525.4, a counterpart foreign application of U.S. Appl. No. 14/137,813.

Translated Chinese Office Action dated Apr. 20, 2018 for Chinese patent application No. CN201380069499.5, a counterpart foreign application of U.S. Pat. No. 9,609,575 , 7 pages.

Office Action for U.S. Appl. No. 13/732,111, dated Sep. 11, 2018, Hongliang Zhang, "Intelligent Routing of Network Packets on Telecommunication Devices", 7 pages.

Chinese Office Action dated Aug. 28, 2018 for Chinese Patent Application No. 201380069525.4, a counterpart foreign application of U.S. Appl. No. 14/137,813.

European Office Action dated Oct. 22, 2018, for European Patent Application No. 13867293.6, a counterpart foreign application of the U.S. Appl. No. 14/137,813, 7 pages.

* cited by examiner

SERVICE PREFERENCES FOR MULTIPLE-CARRIER-ENABLED DEVICES

RELATED APPLICATIONS

This patent application is a continuation-in-part application of and claims priority to the U.S. patent application entitled "Intelligent Routing of Network Packets on Telecommunication Devices" with Ser. No. 13/732,111 filed on Dec. 31, 2012, which is fully incorporated herein by reference.

This patent application also claims priority to the U.S. provisional patent application entitled "Service Preferences for Multiple-Carrier-Enabled Devices" with Ser. No. 61/911,047 filed on Dec. 3, 2013, which is fully incorporated herein by reference.

BACKGROUND

Telecommunication devices have evolved from mobile replacements for the telephone to all-in-one communication, media, and productivity solutions. In addition to voice calling, telecommunication devices now support video and song playback, calendaring, and a variety of features requiring communication over a packet-based network. Such features include web browsing, video streaming, video chat, and many others. To support such packet-based communications, network operators have enhanced their circuit-based telecommunication network offerings by building and offering packet-based telecommunication networks, such as Long Term Evolution (LTE) and Evolved High-Speed Packet Access (HSPA+) networks. In addition to packet-based telecommunication network services, telecommunication devices are now also typically equipped to engage in packet-based communications through wireless data networks, such as WiFi networks, WiMax networks, or Bluetooth networks, or through infrared technology.

With the rapid spread of wireless data networks and packet-based telecommunication networks, telecommunication devices typically have multiple network connectivities to select from. For example, a telecommunication device could download an audio file via a packet-based telecommunication network offered by the network operator tethered to that telecommunication device or via a WiFi network. Typically, selection of a network connectivity is made based on a universal preference (e.g., always use WiFi when available). Such selection techniques often provide suboptimal results, however, and do not take full advantage of the continuously improving packet-based communication infrastructure available to telecommunication devices. Further, each network operator has advantages and disadvantages; some may offer great coverage, but at a high price, while others may offer suboptimal coverage at a lower price. Also, a given network operator may have better coverage in some locations than in others. Telecommunication devices may not be able to take advantage of these varying benefits, however, as they are often tethered to a single network operator.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
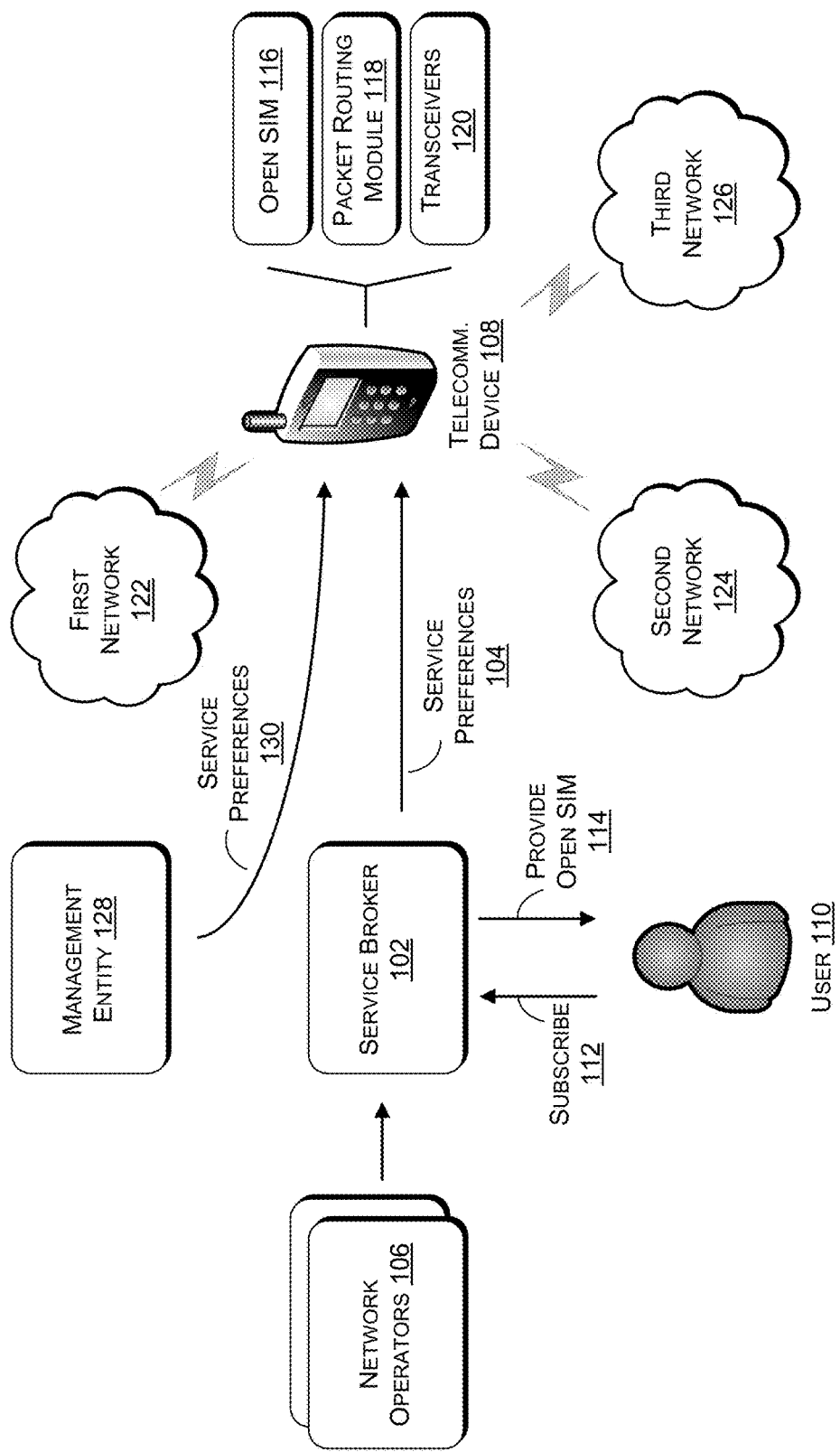
FIG. 1 illustrates an example environment in which a service broker generates service preferences based on input from network operators and provides the service preferences to a telecommunication device to enable the telecommunication device to intelligently select network connectivities to use for transmission of network packets.

This disclosure describes, in part, techniques for generating service preferences for a telecommunication device. Those service preferences are then provided to the telecommunication device to enable the telecommunication device to select a network connectivity from a plurality of network connectivities based at least in part on the service preferences. The network connectivities are respectively associated with a plurality of network operators. The service preferences may be generated and provided by any of a network operator, a service broker, or a management service.

To intelligently select among a plurality of available network connectivities, a telecommunication device may be equipped with a packet routing module to select a connectivity and route network packets via that connectivity. The telecommunication device may also be equipped with an open subscriber identity module (SIM) which includes authentication information for a plurality of network operators and thus enables selection of available network connectivities associated with those network operators. The user of the telecommunication device may receive the open SIM from a service broker in exchange for subscribing to services of that service broker. Alternatively, the user may receive the open SIM from a network operator, from a management service, or the telecommunication device may be built to include an open SIM. The packet routing module may be part of a platform of the telecommunication device or may be received from the service broker, network operator, or management service.

In various embodiments, the telecommunication device intelligently selects among the available network connectivities based on service preferences. Service preferences may prioritize at least one of connection performance, cost, power consumption, bandwidth, packet delivery efficiency, security level, coverage, and user experience. Service preferences may also prioritize between different network operators associated with the available network connectivities. In some embodiments, the service preferences may be an aggregation of service preferences of the different network operators that is generated by a service broker or may be service preferences received from a single network operator. Further, the service preferences may include different fees respectively associated with different levels of usage of a specific network connectivity associated with a specific network operator. The service preferences may also be associated with a location of the telecommunication device and may be updated as that location changes. The telecommunication device may utilize the service preferences alone or in conjunction with network connectivity metrics or packet attributes in selecting a network connectivity.

In some embodiments, the service preferences may be received from a management service and may include a policy which is enforced by the telecommunication device. The policy may dictate which network connectivity is selected and may prevent the user of the telecommunication device from providing input which changes the network connectivity selected by the telecommunication device. For example, the telecommunication device may be provided to the user by the user's employer, and the employer may subscribe to the management service to manage network usage on its telecommunication devices.

In further embodiments, as mentioned above, the service preferences may be generated by a service broker. The service broker may receive service policies, indications of network conditions, usage histories, or service fees from a plurality of network operators and may generate service preferences based on those service policies, indications of network conditions, usage histories, or service fees. In some embodiments, the service policies, indications of network conditions, usage histories, or service fees may be provided as service preferences of the network operators and the service broker may aggregate those service preferences. The user of the telecommunication device may subscribe to services of the service broker, and in return the service broker may provide service preferences to the telecommunication device. The service broker may also provide either or both of the open SIM or the packet routing module, as mentioned above. The service preferences may be provided automatically or responsive to a user request.

In various embodiments, the service preferences may be generated by a network operator and provided by that network operator to the telecommunication device. The user of the telecommunication device may have a non-exclusive service contract or a service contract without a set-term with the network operator. The network operator may prioritize network connectivities associated with its network, may offer different fees depending on the usage by the telecommunication device of that network, etc. The service preferences may be provided automatically or responsive to a user request.

The telecommunication device may further enable the user of the telecommunication device to update service preferences through a preferences user interface. Alternatively or additionally, the user may update the service preferences through a website. In some embodiments, the changes may trigger an update to service preferences by a service broker or network operator, which may then provide updated service preferences to the telecommunication device. In further embodiments, the service broker or network operator may monitor network usage at the location of the telecommunication device and provide updated service preferences based on that network usage.

Example Environments

FIG. 1 illustrates an example environment in which a service broker generates service preferences based on input from network operators and provides the service preferences to a telecommunication device to enable the telecommunication device to intelligently select network connectivities to use for transmission of network packets. As illustrated, a service broker 102 may generate service preferences 104 based on input from a plurality of network operators 106 and may provide the service preferences 104 to a telecommunication device 108. The telecommunication device 108 may be associated with a user 110 who has subscribed 112 to services of the service broker 102. The service broker 102 may provide 114 an open SIM 116 to the user 110, unless the telecommunication device 108 is already provisioned with an open SIM 116. The telecommunication device 108 may also be provisioned with a packet routing module 118 and transceivers 120. The telecommunication device 108 may utilize the service preferences 104, open SIM 116, packet routing module 118, and transceivers 120 to select among connectivities for a first network 122, a second network 124, and a third network 126. In some embodiments, the user 110 or an entity associated with the user 110 may subscribe to services of a management entity 128, which may provide service preferences 130 in addition to or in place of the service preferences 104.

Figure 5:
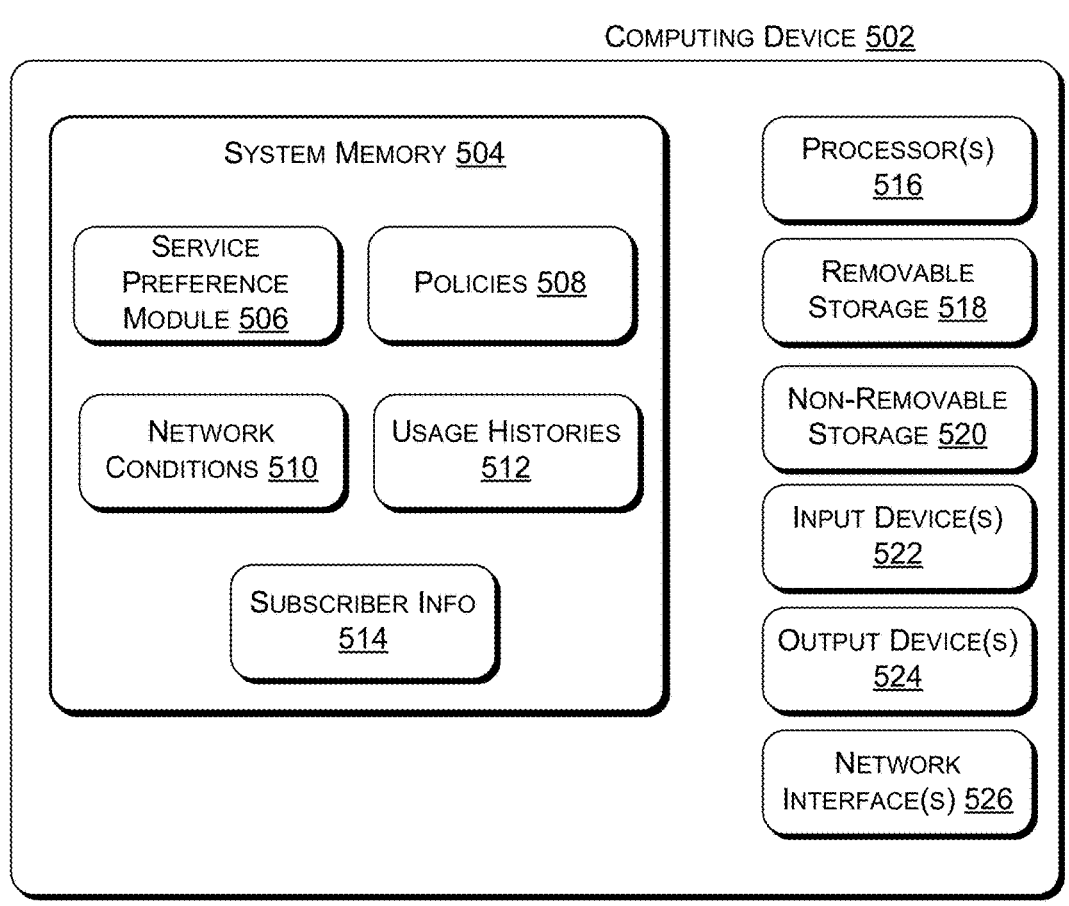
FIG. 5 illustrates an example computing device configured with a service preference module for generating service preferences and providing the service preferences to a telecommunication device.

In various embodiments, each of the service broker 102, the network operators 106, and the management entity 128 may be associated with one or more computing devices. Such computing devices may each be any of a server or server farm, multiple, distributed server farms, a mainframe, a work station, a personal computer (PC), a laptop computer, a tablet computer, an embedded system, or any other sort of device or devices. In some embodiments, the computing devices may form a cloud computing device. In further embodiments, the computing devices may include one or more virtual machines. An example computing device is illustrated in FIG. 5 and described below with reference to that figure.

Figure 6:
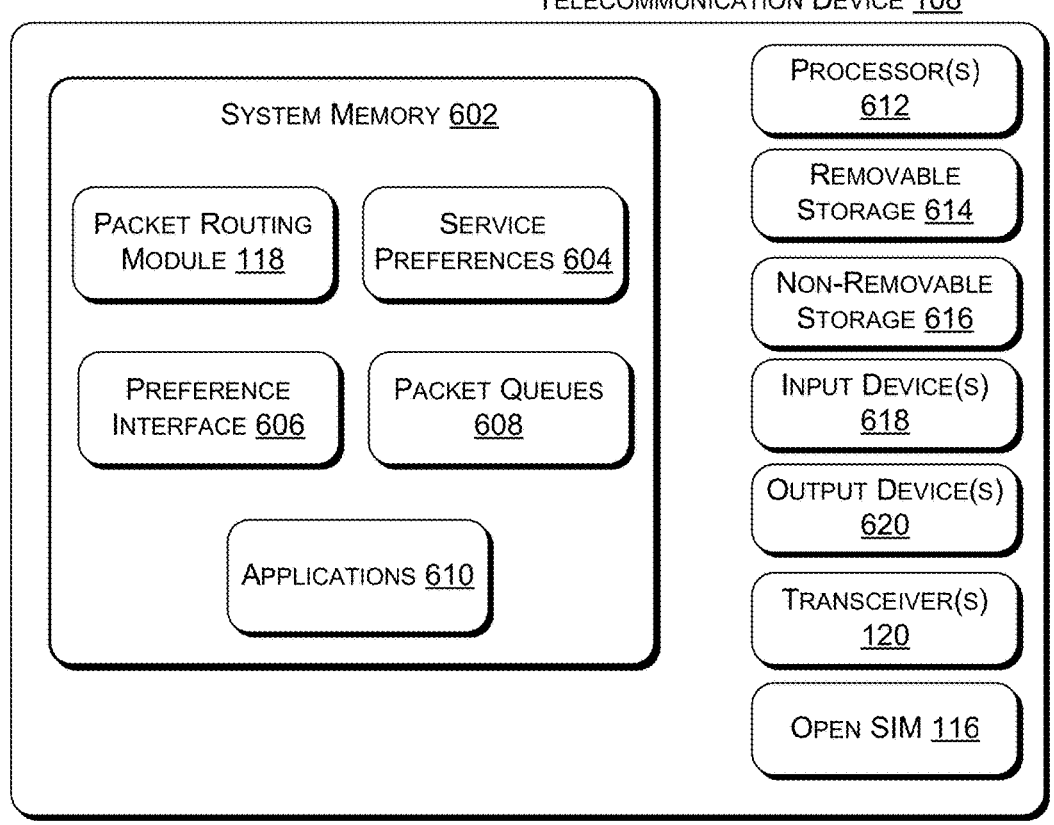
FIG. 6 illustrates an example telecommunication device configured with a packet routing module and service preferences for selecting network connectivities to use for transmission of network packets.

In various embodiments, the telecommunications device 108 may be any sort of device capable of engaging in packet-based connections and of having multiple wireless network connectivities. For example the telecommunications device 108 may be any of a smart phone, a tablet computer, a personal digital assistant (PDA), a personal computer (PC), a laptop computer, a media center, a work station, etc. An example telecommunications device 108 is illustrated in FIG. 6 and described below with reference to that figure.

In some embodiments, the service broker 102 may be an entity which provides service preferences 104 to telecommunication devices 108 of users 110 who are subscribed 112 to services of the service broker 102. If the telecommunication device 108 is not provisioned with either or both of an open SIM 116 or a packet routing module 118, the service broker 102 may provide the open SIM 116 to the user 110 to install in the telecommunication device 108 or may provide the packet routing module 118 to the telecommunication device 108. Also, if the user 110 does not have a telecommunication device 108 when subscribing 112, the service broker 102 may provide the user 110 with the telecommunication device 108 (e.g., either through lease or sale). The service broker 102 may also receive input from a plurality of network operators 106, such as service policies, indications of network conditions, usage histories, or service fees from the network operators 106. The service broker 102 then generates the service preferences 104 based at least in part on that network operator input. The service broker 102 may have contractual arrangements with some or all of the network operators 106. Also or instead, the service broker 102 may be an affiliated entity (e.g., a subsidiary) of a network operator 106. The service broker 102 may deal with network operators 106 on charging, policy, and billing and remotely update charging policy for telecommunication device 108.

In various embodiments, the network operators 106 may each be any sort of network operators, such as telecommunication service providers that operate a telecommunication infrastructure, including access networks and a core network, to provide telecommunication services such as voice calling, video calling, messaging, email, and data (e.g., streaming video and audio or web browsing). The network operators 106 may offer these services as part of service plans subscribed to by telecommunication device users or may allow the services to be purchased incrementally (e.g., per packet, per communication session, per connection, etc.).

For example, each of the first network 122, the second network 124, and the third network 126 may be associated with a different network operator 106. Alternatively, two of the first network 122, the second network 124, and the third network 126 may be associated with a single network operator 106, and the other with another network operator 106. Each network operator 106 may charge different fees for usage of its network 122, 124, or 126, which may vary based on the user 110, the telecommunication device 108, the location of service, the utilization of services at that location, or the type of service (e.g., voice, video, data, etc.). Each network operator 106 may provide information to a service broker 102, such as service policies, indications of network conditions, usage histories, or service fees. In some embodiments, each network operator 106 generates service preferences to be suggested to a telecommunication device 108, and may provide the service preferences to the service broker 102. Such service preferences, may, in embodiments, convey the service policies, indications of network conditions, usage histories, or service fees to the service broker 102.

Upon receiving service preferences or service policies, indications of network conditions, usage histories, or service fees from a plurality of network operators 106, the service broker 102 generates the service preferences 104. Additionally or instead, the service broker 102 may generate the service preferences 104 based input received from the user 110 or based on observation of behavior or preferences of the user 110. For instance, as part of the subscription 112 or later, the user 110 may indicate that she prefers to use the "lowest cost" network, and the service broker 102 may generate the service preferences 104 based at least in part on those user preferences. In some embodiments, the service broker 102 may generate the service preferences 104 for the telecommunication device 108 when it first registers. In other embodiments, the service broker 102 may generate and provide the service preferences 104 periodically. In embodiments in which the service broker 102 received service preferences from network operators 106, generating the service preferences 104 may comprise aggregating the service preferences of the network operators.

In various embodiments, the service preferences 104 may prioritize at least one of connection performance, cost, power consumption, bandwidth, packet delivery efficiency, security level, coverage, and user experience. Service preferences 104 may also prioritize between different network operators 106 associated with the available network connectivities. Further, the service preferences 104 may include different fees respectively associated with different levels of usage of a specific network connectivity associated with a specific network operator 106. The service preferences 104 may also be associated with a location of the telecommunication device 108 and may be updated as that location changes. The telecommunication device 108 may utilize the service preferences 104 alone or in conjunction with network connectivity metrics or packet attributes in selecting a network connectivity.

In some embodiments, the service preferences 104 may be any of "best network performance" (which may be a function of factors such as packet delay, packet loss, and jitter), a specific QoS, "lowest cost", "lowest power consumption with the minimum bandwidth", "largest available bandwidth" given specific performance requirements, "best packet delivering efficiency" (e.g., by grouping/sorting network packets), "best overall metrics", "most secure connection", or some combination of these criteria.

As mentioned, a user 110 may subscribe 112 to services of the service broker 102 and may receive, in return, a telecommunication device 108 or, if the user 110 has a telecommunication device 108, the service broker 102 may provide 114 the user 110 with an open SIM 116. In yet other embodiments, the user 110 may have a telecommunication device 108 provisioned with an open SIM 116, and the service broker 102 may simply active service in response to the subscription 112. In further embodiments, subscribing 112 to the service may include indicating preferences or limitations, such as "best performance" or "do not spend more than $100 per month" which may be used by the service broker 102 in generating service preferences 104.

In various embodiments, an open SIM 116 is a SIM that is not tethered to any specific network operator 106. Typically, a SIM is tethered to a specific network operator, providing information (e.g., authentication information) to its network operator that utilizes in enabling services and connectivity for the telecommunication device that includes the SIM. The open SIM 116 provides authentication information to each or any of a plurality of network operators 106 or to a specific subset of network operators 106, enabling the telecommunication device 108 to switch between different network connectivities of different network operators 106. An open SIM 116 may be implemented with multiple SIMs combined, each from one network operator. It may also be implemented as virtual SIM or soft SIM.

The packet routing module 118 is described below in detail with respect to FIG. 3. The packet routing module 118 may form part of the platform of the telecommunication device 108 or may be an application downloaded from the service broker 102 or another source.

In some embodiments, the telecommunication device 108 includes one or more wireless transceivers 120, such as a wireless transceiver for each network connectivity or a wireless transceiver capable of communicating with multiple networks. The telecommunication device 108 may also have a single wireless transceiver 120 with multiple soft radios, such as a soft radio for each network connectivity. To increase throughput, the wireless transceivers 120 may utilize multiple-input/multiple-output (MIMO) technology. The wireless transceivers 120 may be any sort of wireless transceivers capable of engaging in wireless, radio frequency (RF) communication. The wireless transceivers 120 may also include other wireless modems, such as a modem for engaging in WiFi, WiMax, Bluetooth, or infrared communication.

Once the telecommunication device 108 is associated with a subscription 112, has an open SIM 116, packet routing module 118, wireless transceivers 120, and has received service preferences 104, the telecommunication device 108 may select among available network connectivities associated with one or more of the first network 122, the second network 124, and the third network 126. The packet routing module 118 of the telecommunication device 108 utilizes at least the service preferences 104 and, optionally, connectivity metrics or packet attributes in selecting a network connectivity for a packet or flow of packets. Such use of the service preferences 104 in selecting network connectivities is described in greater detail further herein.

In various embodiments, the networks 122-126 may represent one packet-based access network, such as a WiFi network, an LTE network, an HSPA+ network, a Bluetooth network, or a network associated with infrared technology. If one of the networks 122-126 is a packet-based cellular network, such as a LTE network or an HSPA+ network, that network 122, 124, or 126 may include a base station transceiver, base station controller, a node B, or an eNode B. Such a network 122, 124, or 126 may provide connectivity to a core network of a network operator 106. In some embodiments, each of the networks 122-126 that is a packet-based cellular network may be associated with a network operator 106. Multiple ones of the networks 122-126 may be associated with a same network operator 106, or each of the networks 122-126 may be associated with a different network operator 106. Networks 122-126 that are non-cellular data networks, such as WiFi networks, may include an access point device for sending and receiving wireless transmissions. These access devices may in turn be associated with an Internet service provider that provides connectivity to the Internet. For example, the first network 122 may be a WiFi network, the second network 124 may be an LTE network, and the third network 126 may be an HSPA+ network.

In some embodiments, a user 110 may wish to update the received service preferences 104. For example, the service preferences 104 may prioritize "best QoS" over "lowest cost," and the user may wish to alter the order of those preferences. The user 110 may enter or update service preferences 104 through some sort of user interface, such as a graphic user interface (GUI), physical input control, or voice input control. The telecommunication device 108 may then translate the user-provided or user-updated preferences to service preferences 104 based on some rules or models. In some embodiments, rather than entering the user-provided or user-updated preferences through an interface or control of the telecommunication device 108, the user 110 of the telecommunication device 108 may enter the preferences through a web site. Also, in further embodiments, the telecommunication device 108 may provide a GUI that shows costs and performance associated with different service preferences 104 (e.g. decrease in cost per increase in delay measured in milliseconds, or increase in throughput per increase in power consumption). Such a GUI may enable a user 110 to express preferences that result in more satisfactory service preferences. Also, if the user-provided or user-updated preferences will result in changes service fees or other service parameters from a network operator 106, the GUI may warn the user 110 of this and ask the user 110 to confirm that he or she wishes to proceed.

The service preferences 104 may be dynamically updated at any time. For example, a user 110 may be unhappy with the quality of the video played on the telecommunication devices 108 and may actuate a soft key or physical button, or may provide a spoken command (e.g., "increase quality"). This new user-provided preference may be translated into an updated service preference 104 (e.g., better performance or improved QoS) that is used going forward in selecting network connectivities for network packets.

In some embodiments, the telecommunication device 108 may monitor the usage by the user 110 of voice, video, and data services provided via networks 122-126 and update the service preferences 104 based on the monitoring. Such monitoring and updating may involve machine learning techniques which may progressively improve the service preferences 104 to match preferences of the user 110.

In various embodiments, the service broker 102 may update the service preferences 104, either periodically or in response to an event, such as updated input from a network operator 106 or service preference updates made by the user 110. As mentioned above, a user 110 may specify a new service preference 104 or modify one or more of the service preferences 104 provided by the service broker 102. The service broker 102 may be notified of the new or modified service preferences 104 by the telecommunication device 108 and may, in response, update the service preferences 104. For example, the service preferences 104 provided to the telecommunication device 108 may have prioritized one network operator 106 over another, and the user 110 may have modified the service preferences 104 to reverse that priority. In response to the user modification, the service broker 102 may generate updated service preferences 104 that reflect different service fees for the network operators 106. The service broker 102 may then provide the updated service preferences 104 to the telecommunication device 102.

The service broker may also receive new input from one or more of the network operators 106 from time to time. For example, a network operator 106 may update its service fees based on the network usage at a specific location and may provide indicia of that update to the service broker 102. The service broker 102 may then generate updated service preferences 104 and provide those updated service preferences 104 to the telecommunication device 102.

In some embodiments, the service broker 102 or a network operator 106 may monitor the usage by the user 110 of voice, video, and data services provided via one or more of the networks 122-126 and update the service preferences 104 based on the monitoring. Such monitoring and updating may involve machine learning techniques which may progressively improve the service preferences 104 to match preferences of the user 110.

In various embodiments, the management entity 128 may provide remote device management services, controlling which network connectivity that the telecommunication device 108 selects. In such embodiments, the user 110 may be an employee of an entity that subscribes to the management services offered by the management entity 128. The management entity 128 may control the network connectivity selection so that the selection is in line with preferences of the employer/service subscriber rather than the user 110. To control the network connectivity selection, the management entity 128 generates and provides service preferences 130 which include a policy that determines which network connectivity is selected. The management entity 128 may generate service preferences 130 in a manner similar to that described above for the service broker 102, taking into account input from the network operators 106. The user 110 may also not be able to modify the service preferences 130, and if the telecommunication device 104 receives both service preferences 104 and service preferences 130, the service preferences 130 may override the service preferences 104. In other embodiments, the telecommunication device 108 may only receive service preferences 130, not service preferences 104, and the user 110 may not have a subscription with the service broker 102.

Figure 2:
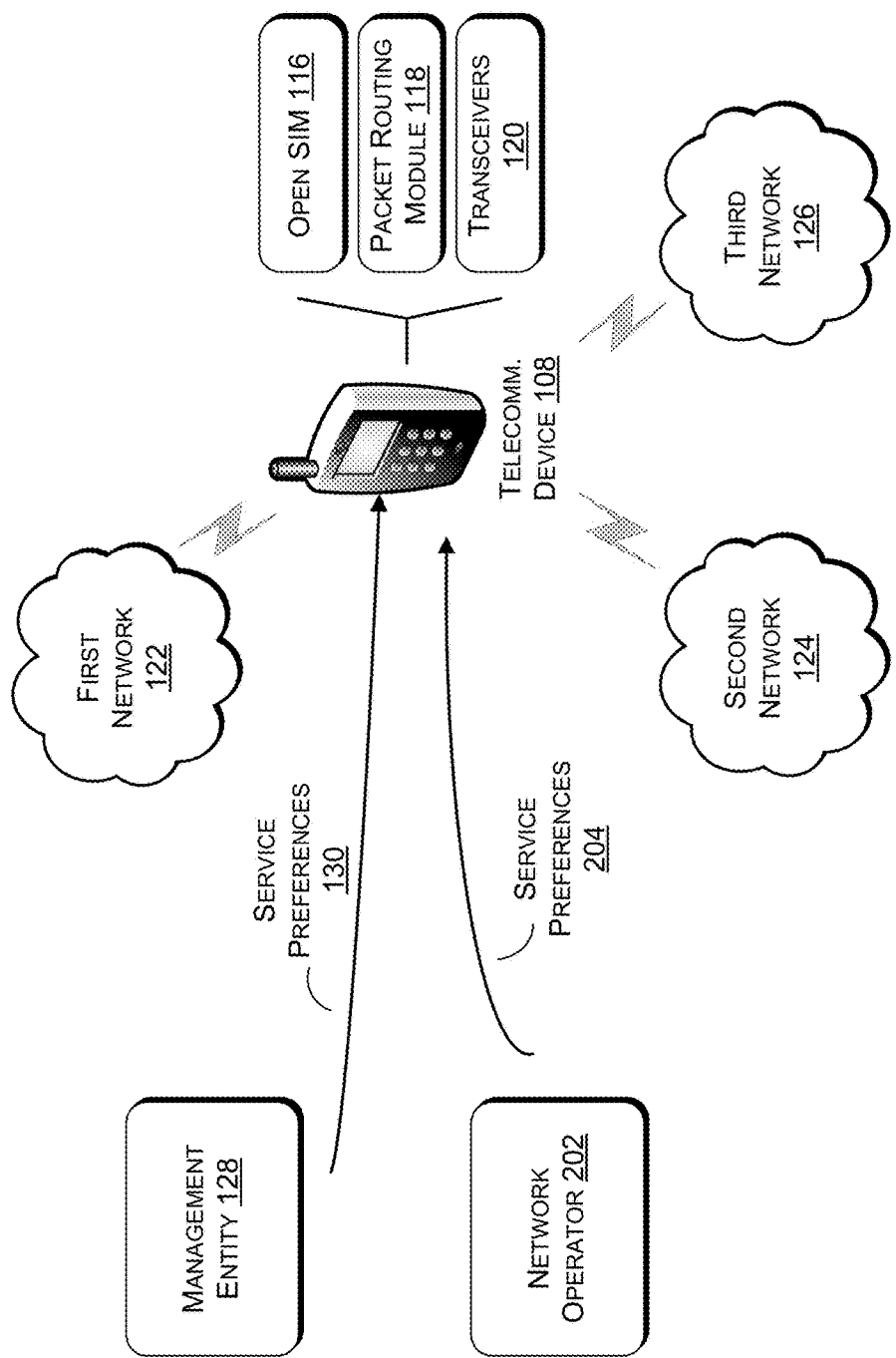
FIG. 2 illustrates an example environment in which a network operator generates service preferences and provides the service preferences to a telecommunication device to enable the telecommunication device to intelligently select network connectivities to use for transmission of network packets.

FIG. 2 illustrates an example environment in which a network operator generates service preferences and provides the service preferences to a telecommunication device to enable the telecommunication device to intelligently select network connectivities to use for transmission of network packets. As illustrated, a network operator 202 may generate service preferences 204 and provide those service preferences 204 directly to the telecommunication device 108, without any service broker 102 being involved.

In various embodiments, the network operator 202 may be one of the network operators 106 described above, but may generate, update, and provide its own service preferences 204 to the telecommunication device 108. The user 110 may have a service arrangement with the network operator 202. For example, the user 110 may have purchased the telecommunication device 108 from the network operator 202, subscribed to a non-exclusive or non-set-term service contract with the network operator 202, etc. The network operator 202 may also provide the open SIM 116 to the user 110, if the telecommunication device 108 is not provisioned with an open SIM 116, and may provide the packet routing module 118.

The service preferences 204 may be the same as the service preferences 104, except that service preferences 204 are generated by a network operator 202 rather than a service broker 102. Also, the service preferences 204 may reward the user 110 for utilizing the network 122, 124, or 126 of the network operator 202, providing differing service fees based on different levels of usage of the network 122, 124, or 126 of the network operator 202.

Example Routing Module

Figure 3:
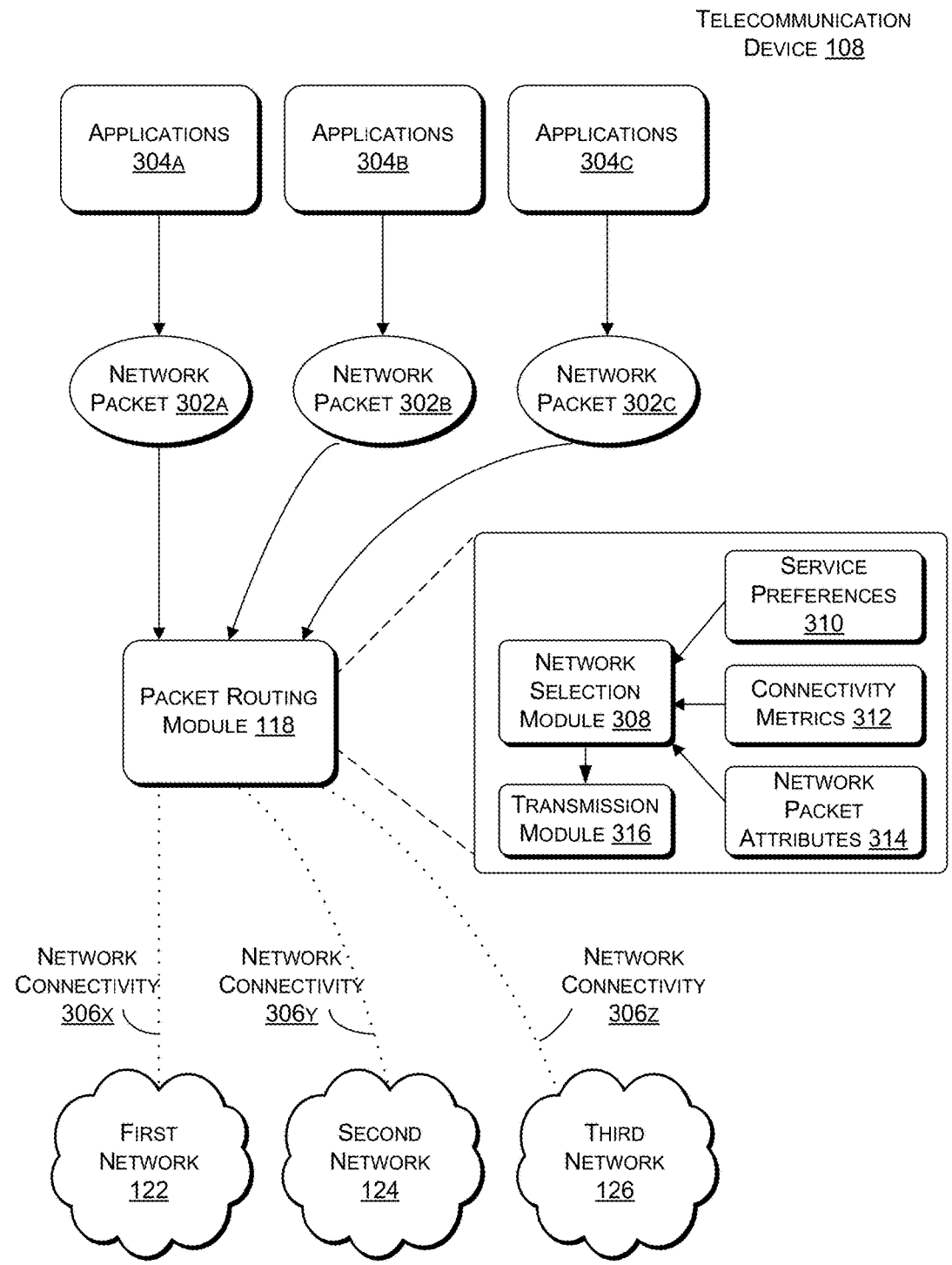
FIG. 3 illustrates an example telecommunication device packet routing module for intelligently selecting network connectivities to use for transmission of network packets.

FIG. 3 illustrates an example telecommunication device packet routing module for intelligently selecting network connectivities to use for transmission of network packets. As illustrated, a telecommunications device 108 may be configured with a packet routing module 118 to route network packets 302a-302c from telecommunication device applications 304a-304c. To transmit at least one of the network packets 302a-302c, the packet routing module 118 selects a network connectivity 306 of a plurality of network connectivities 306x-306z respectively associated with a plurality of networks 122-126. A network selection module 308 of the packet routing module 118 selects the network connectivity 306 based on an evaluation of service preferences 310, connectivity metrics 312 associated with the network connectivities 306x-306z, and network packet attributes 314 associated with the network packet(s) 302 that is/are to be transmitted. After selecting the network connectivity 306, a transmission module 316 of the packet routing module 118 then utilizes the selected network connectivity 306 to transmit the network packet(s) 302.

In some embodiments, the packet routing module 118 receives the network packets 302a-302c from the applications 304a-304c and stores the network packets 302a-302c in a queue or stack associated with the packet routing module 118. The network packets 302a-302c may be any sort of Internet Protocol (IP) packets or other sort of network packets. The applications 304a-304c may be any sort of telecommunication device applications which send and receive network packets. For example, the application 304a may be a web browser and network packet 302a may be a request for web content. Application 304b may be a video call client and network packet 302b may be a packet associated with a video call. Application 304c may be client for a multi-player online game and network packet 302c may be a packet associated with a game-play session. These examples are provided only for the sake of illustration; applications 304a-304c may be or include many other different types of applications.

Upon storing the network packets 302a-302c in the queue or stack (or as they are stored), the packet routing module 118 may collect network packet attributes 314 of the network packets 302a-302c and perform quality of service (QoS) marking of the network packets 302a-302c. The collected network packet attributes 314 may include any of the network protocols of the network packets 302a-302c, such as the transmission control protocol (TCP), the user datagram protocol (UDP), or the real-time transport protocol (RTP), QoS profiles, packet size, destination address, bandwidth demand, class of services, or security level.

In various embodiments, before, during, and after receiving the network packets 302a-302c (e.g., on a substantially continuous basis), the packet routing module 118 determines the network connectivities 306x-306z available to the telecommunication device 108 as well as connectivity metrics 312 for those network connectivities 306x-306z. The network connectivities 306x-306z may be connectivities to a variety of different packet-based networks 122-126, such as WiFi networks, LTE network, or HSPA+ networks. The available network connectivities 306x-306z may change based on movement of the telecommunication device 108 to a different location or may even change at a given location based on factors such as signal strength or congestion of a network 122-126. The connectivity metrics 312 collected for each network connectivity 306x-306z may include:

- a network protocol used for the associated network 122-126, such as TCP, UDP, or RTP,
- the availability of the associated network 122-126 at the current location and time,
- performance of a transmission across the associated network 122-126 (delay, jitter, packet-loss rate),
- power consumption associated with use of the associated network 122-126,
- a bandwidth profile for the associated network 122-126,
- connection cost for use of the associated network 122-126, or
- security level.

The networks 122-126 are described in detail with respect to FIGS. 1 and 2. As shown in FIG. 3, the network connectivity 306x may be a network connectivity associated with the first network 122, the network connectivity 306*y* may be a network connectivity associated with the second network 124, and the network connectivity 306*z* may be a network connectivity associated with the third network 126.

In various embodiments, the packet routing module 118 may include both a network selection module 308 and transmission module 316 to select a network connectivity 306 and to transmit network packet(s) 302 using the network connectivity 306. The network selection module 308 selects a network connectivity 306 for each received network packet 302 and may do so substantially when that network packet 302 is received or at a later time. Each selection is based at least on service preferences 310, and possibly also on connectivity metrics 312, and attributes 314 of the network packet 302 for which the network connectivity 306 is being selected. The connectivity metrics 312 may vary from moment to moment and from location to location, and the attributes 314 may be different for each network packet 302. Even when there is no substantial change in connectivity metrics 312 or attributes 314 between the receiving of two network packets 302, the service preferences 310 may result in the network selection module 308 selecting different network connectivities 306.

In some embodiments, the service preferences 310 may include any one or more of service preferences 104, service preferences 130, service preferences 204, or user-specified service preferences or service preference updates. Such service preferences 310 are described in greater detail above.

In various embodiments, the network selection module 308 determines a score for each network connectivity 306. The score may reflect the degree to which the connectivity metrics 312 for the network connectivity 306 meet the service preferences 310 given the attributes 314 of the network packet 302 to be transmitted. The network selection module 308 may then select the network connectivity 306 with the highest score to use in transmitting the network packet 302. In some embodiments, the network selection module 308 may select a specific network connectivity 306 as a default routing path based on the service preferences 310.

Once the network selection module 308 has selected the network connectivity 306 to use for transmitting the network packet 302, the network selection module 308 invokes the transmission module 316. The transmission module 316 may establish a connection with the network 122, 124, or 126 associated with the selected network connectivity 306, unless one is already established, and transmit the network packet 302 to the network 122, 124, or 126 over the connection.

Example Routing Scenarios

Figure 4:
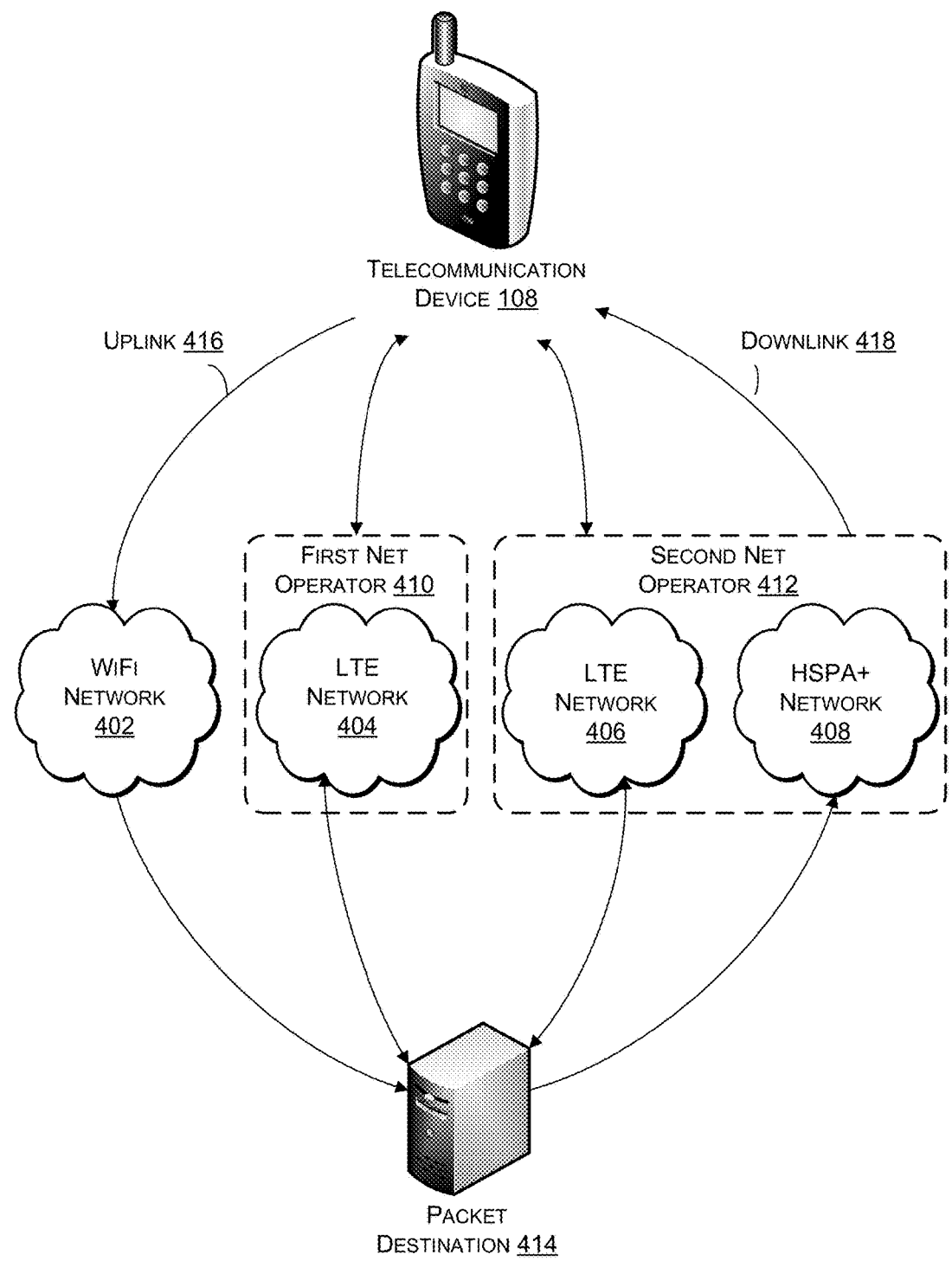
FIG. 4 illustrates a plurality of packet-based networks supporting various packet routing scenarios.

FIG. 4 illustrates a plurality of packet-based networks supporting various packet routing scenarios. As illustrated, the telecommunication device 108 has network connectivities associated with a WiFi network 402, an LTE network 404, an LTE network 406, and an HSPA+ network 408. The LTE network 404 is operated by a first network operator 410, and the LTE network 406 and HSPA+ network 408 are operated by a second network operator 412. The telecommunication device 108 may transmit one or more network packets to the packet destination 414 over one or more of the networks 402-408. Also, as illustrated, the telecommunication device 108 may select one network connectivity, such as the network connectivity associated with the HSPA+ network 408, for downlink communications 416 and another network connectivity, such as the network connectivity associated with the WiFi network 402, for uplink communications 418.

In various embodiments, the networks 402-408 may be examples of the networks 122-126 illustrated in FIGS. 1-3 and described herein with reference to those figures. The first network operator 410 and second network operator 412 may be examples of network operators 106 or the network operator 202, which are described above in greater detail.

The packet destination 414 may be any sort of device or devices identifiable by a network address. Such a device or devices may include another telecommunication device, a server, a network or cloud, or any sort of computing device. The network address of the packet destination 414 is specified by the network packet that is to be transmitted to the packet destination 414.

In a first routing scenario, the telecommunication device 108 has multiple network connectivities respectively associated with multiple, different network operators, including the first network operator 410 and the second network operator 412. In such a scenario, the user of the telecommunication device 108 may not be tethered to a service plan of any specific network operator, or may be subject to a non-exclusive service plan. The telecommunication device 108 may utilize service preferences, such as service preferences 104, 130, or 310, and, optionally, evaluate the connectivity metrics associated with the network connectivities in selecting a network connectivity. For example, a first network connectivity associated with an LTE network 404 operated by the first network operator 410 may have a lower cost than a second network connectivity associated with an LTE network 406 operated by the second network operator 412. If the service preferences specify "use lowest cost," the telecommunication device 108 may select the first network connectivity associated with the LTE network 404, establish a connection to the LTE network 404 (or use an established connection) and transmit a network packet to the packet destination 414 over the LTE network 404. After transmitting the network packet, there may be a change to the service preferences, connectivity metrics, or packet attributes. For example, the second network operator 412 may lower its cost, and that lower cost may be reflected in updated service preferences or connectivity metrics. If the service preferences still specify "use lowest cost," the telecommunication device 108 may then select the second network connectivity associated with the LTE network 406 for transmission of further network packets.

In a second scenario, network packets associated with a single logical connection (e.g., a video call) may be transmitted first over one network (e.g., LTE network 406) and then another (e.g., HSPA+ network 408) based on updated service preferences or varying metrics/attributes, without interruption to the logical connection. For example, the attributes of the network packets and connectivity metrics may stay largely the same, but the telecommunication device 108 may receive updated service preferences, or the user may modify the service preferences. The user may modify the service preferences, for instance, because of suboptimal quality of experience. In this example, the update may result in service preferences that require a higher quality of service (QoS). This higher QoS may, in turn, result in the telecommunication device 108 selecting a second network (e.g., HSPA+ network 408) in place of a previously used, first network (e.g., LTE network 406).

In a third routing scenario, different networks 402-408 may be associated with different network topologies. These different network topologies may result in significantly different network latencies. For example, a telecommunication device 108 may have a first network connectivity associated with a WiFi network 402 and a second network connectivity associated with an LTE network 404. The packet destination 414 may be geographically proximate to the telecommunication device 108, and the network topology of the LTE network 404 may require all network traffic to be sent to a node of the first network operator 410 a significant distance from the telecommunication device 108. When using the LTE network 404, then, this far distance must be traversed twice to send the network packet to its destination 414. When using the WiFi network 402, only a short distance need be traversed. To detect such differences in network topologies, the telecommunication device 108 may send messages to the destination 414 using each of the networks 402 and 404, receive responses, and calculate round trip times. This may be performed by the telecommunication device 108, for example, using a ping utility. These round trip times may then be evaluated in light of the service preferences to select a network connectivity. If the service preferences specify "select lowest network latency," the telecommunication device 108 may select the WiFi network 402.

In some embodiments, the calculation of network latencies need not be repeated for each packet; rather, the telecommunication device 108 need only calculate the network latencies once for a logical connection, a session, a flow, or for packets associated with a same destination 414 that are transmitted within a time window of each other.

In a fourth scenario, the telecommunication device 108 may select different network connectivities for uplink communications 418 and downlink communications 416. For example the telecommunication device 108 may select a network connectivity associated with the HSPA+ network 408 for downlink communications 416 and a network connectivity associated with the WiFi network 402 for uplink communications 418. The telecommunication device 108 may then transmit network packets using the WiFi network 402 and receive network packets using the HSPA+ network 408.

In a fifth routing scenario, telecommunication device 108 may sort or combine for transmission multiple network packets to better achieve the service preferences. This may involve grouping network packets by size, destination, or QoS profile and transmitting the grouped networked packets using a same one of the networks 402-408 or concurrently over multiple ones of the networks 402-408. Also or instead, the sorting may involve prioritizing some network packets and delaying others.

In a sixth routing scenario, the service preferences may specify "maximum throughput" and the telecommunication device 108 may, as a result, select all available network connectivities for transmission of packets to the packet destination 414. In such a scenario, the telecommunication device 108 may connect to each of the networks 402-408 and may simultaneously transmit packets over all of the networks 402-408.

The above scenarios are described for the sake of illustration and do not limit the routing scenarios possible given the packet routing techniques described herein.

Example Devices

FIG. 5 illustrates an example computing device configured with a service preference module for generating service preferences and providing the service preferences to a telecommunication device. As illustrated, a computing device 502 comprises a system memory 504 storing service preferences module 506, policies 508, network conditions 510, usage histories 512, and subscriber information 514. Also, the computing device 502 includes processor(s) 516, a removable storage 518 and non-removable storage 520, input device(s) 522, output device(s) 524, and network interface(s) 526. The computing device 502 may be associated with any of the service broker 102, the management entity 128, or the network operator 202.

In various embodiments, system memory 504 is volatile (such as RAM), non-volatile (such as ROM, flash memory, etc.) or some combination of the two. The service preferences module 506, policies 508, network conditions 510, usage histories 512, and subscriber information 514 stored in the system memory 504 may comprise methods, threads, processes, applications or any other sort of executable instructions. The service preferences module 506, policies 508, network conditions 510, usage histories 512, and subscriber information 514 may also include files and databases.

The service preferences module 506 comprises any logic capable of generating, updating, and providing service preferences in the manner described in greater detail further herein. Also, further description of the policies 508, network conditions 510, usage histories 512, and subscriber information 514 is provided above.

In some embodiments, the processor(s) 516 is a central processing unit (CPU), a graphics processing unit (GPU), or both CPU and GPU, or other processing unit or component known in the art.

Computing device 502 also includes additional data storage devices (removable and/or non-removable) such as, for example, magnetic disks, optical disks, or tape. Such additional storage is illustrated in FIG. 5 by removable storage 518 and non-removable storage 520. Tangible computer-readable media may include volatile and nonvolatile, removable and non-removable media implemented in any method or technology for storage of information, such as computer readable instructions, data structures, program modules, or other data. System memory 504, removable storage 518 and non-removable storage 520 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 502. Any such tangible computer-readable media may be part of the computing device 502.

Computing device 502 also has input device(s) 522, such as a keypad, a cursor control, a touch-sensitive display, voice input device, etc., and output device(s) 524 such as a display, speakers, etc. These devices are well known in the art and need not be discussed at length here.

Computing device 502 further includes network interface(s) 526 for wired and/or wireless communication with other computing devices over one or more networks, such as any of networks 122-124, public networks, private networks, or the Internet. Such network interfaces are well known in the art and need not be discussed at length here.

FIG. 6 illustrates an example telecommunication device configured with a packet routing module and service preferences for selecting network connectivities to use for transmission of network packets. As illustrated, telecommunication device 108 comprises a system memory 602 storing a packet routing module 118, service preferences 604, a preference interface 606, packet queues 608, and applications 610. Also, the telecommunication device 108 includes processor(s) 612, a removable storage 614 and non-removable storage 616, input device(s) 618, output device(s) 620, transceivers 120, and an open SIM 116.

In various embodiments, system memory 602 is volatile (such as RAM), non-volatile (such as ROM, flash memory, etc.) or some combination of the two. The packet routing module 118, service preferences 604, preference interface 606, packet queues 608, and applications 610 stored in the system memory 602 may comprise methods, threads, processes, applications or any other sort of executable instructions. The packet routing module 118, service preferences 604, preference interface 606, packet queues 608, and applications 610 may also include files and databases. Further description of the packet routing module 118, examples of service preferences 604 (e.g., service preferences 104, service preferences 130, service preferences 204, and service preferences 310), and applications 610 is provided above.

In further embodiments, the preference interface 606 may be any sort of GUI, physical control, or voice control through which a user may enter preferences used to modify or request an update to the service preferences 604. Such preference interfaces 606 are described in further detail herein when describing examples of service preferences 604 (e.g., service preferences 104, service preferences 130, service preferences 204, and service preferences 310).

In various embodiments, the packet queues 608 may include one or more queues or stacks associated with the packet routing module 118. Such packet queues 608 may be used to store the network packets 302 pending selection of a network connectivity 306 for each network packet 302. Packet queues 608 may also include queues or stacks associated with wireless transceivers 120 or with network protocols used in transmitting the network packets 302 any one or more of network(s) 122-126.

In some embodiments, the processor(s) 612 is a central processing unit (CPU), a graphics processing unit (GPU), or both CPU and GPU, or other processing unit or component known in the art.

Telecommunication device 108 also includes additional data storage devices (removable and/or non-removable) such as, for example, magnetic disks, optical disks, or tape. Such additional storage is illustrated in FIG. 6 by removable storage 614 and non-removable storage 616. Tangible computer-readable media may include volatile and nonvolatile, removable and non-removable media implemented in any method or technology for storage of information, such as computer readable instructions, data structures, program modules, or other data. System memory 602, removable storage 614 and non-removable storage 616 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the telecommunication device 108. Any such tangible computer-readable media may be part of the telecommunication device 108.

Telecommunication device 108 also has input device(s) 618, such as a keypad, a cursor control, a touch-sensitive display, voice input device, etc., and output device(s) 620 such as a display, speakers, etc. These devices are well known in the art and need not be discussed at length here.

Wireless transceivers 120 and open SIM 116 are described above in detail with respect to FIG. 1.

Example Processes

Figure 7:
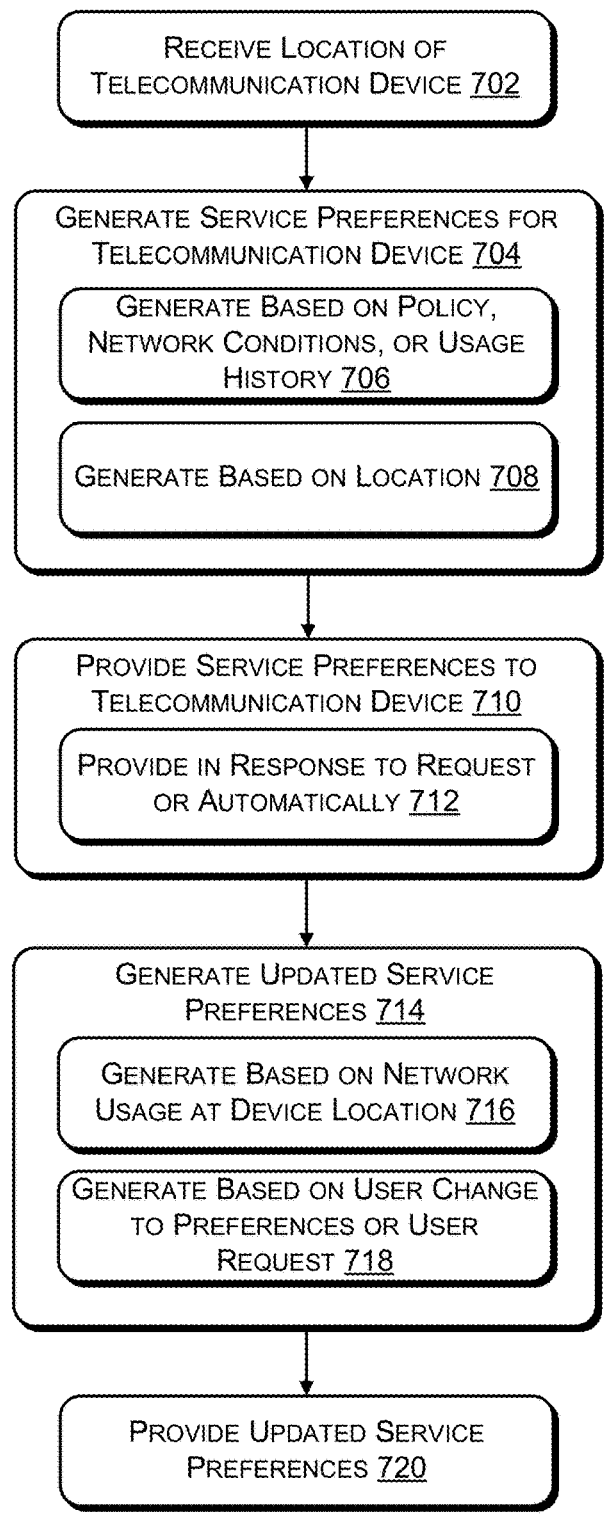
FIG. 7 illustrates an example process of a network operator for generating service preferences for a telecommunication device and providing the service preferences to the telecommunication device to enable the telecommunication device to intelligently select network connectivities to use for transmission of network packets.
Figure 8:
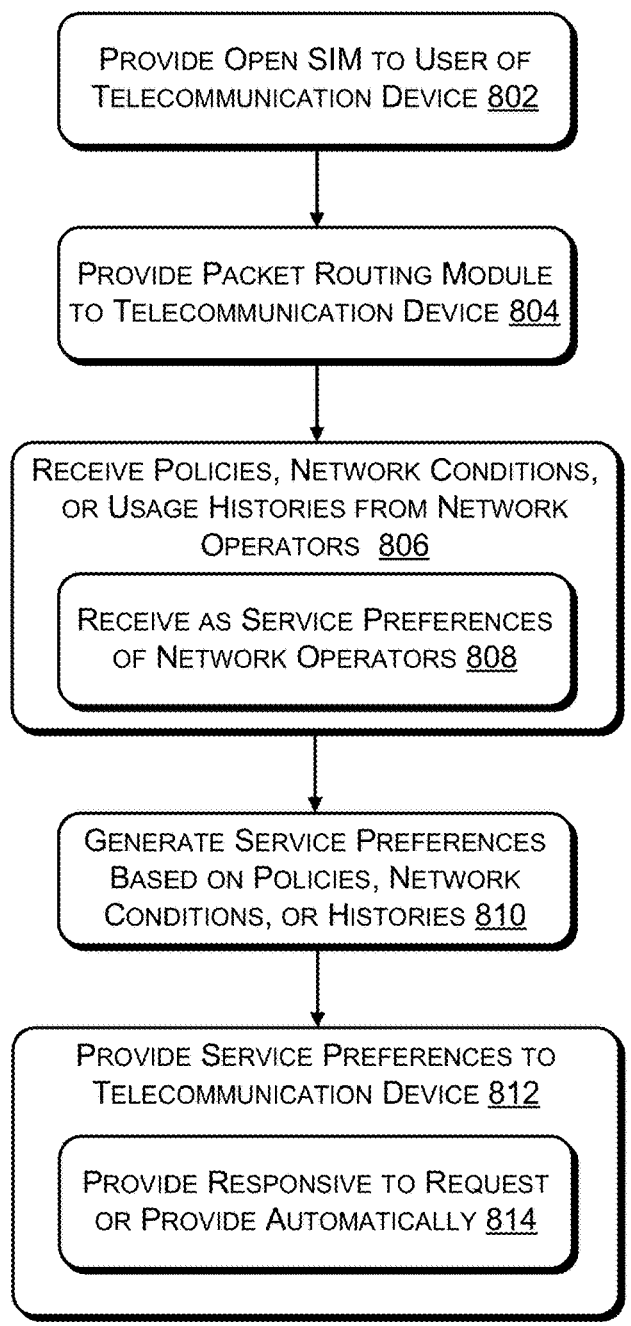
FIG. 8 illustrates an example process of a service broker for generating service preferences for a telecommunication device based on input from network operators and providing the service preferences to the telecommunication device to enable the telecommunication device to intelligently select network connectivities to use for transmission of network packets.
Figure 9:
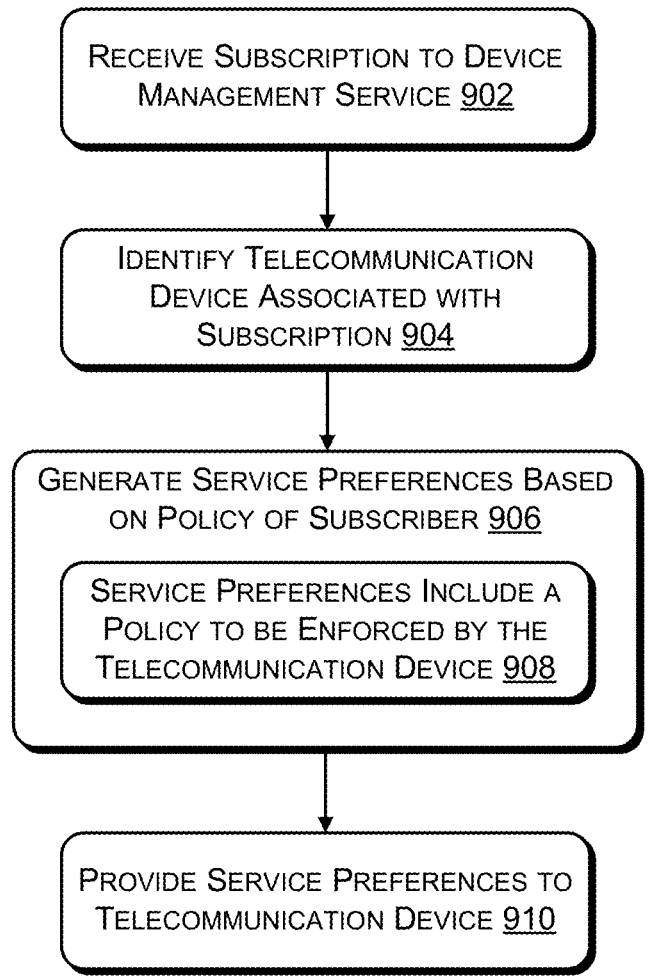
FIG. 9 illustrates an example process of a management service for generating service preferences for a telecommunication device and providing the service preferences to the telecommunication device to manage intelligent selection by the telecommunication device of network connectivities to use for transmission of network packets.

FIGS. 7-9 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 7 illustrates an example process of a network operator for generating service preferences for a telecommunication device and providing the service preferences to the telecommunication device to enable the telecommunication device to intelligently select network connectivities to use for transmission of network packets. The process includes, at 702, receiving, by a network operator, a location of a telecommunication device. The telecommunication device may be associated with a user who does not have a set-term service contract with the network operator.

At 704, the network operator generates service preferences for the telecommunication device. At 706, the generating is based at least in part on one or more network conditions, a network operator policy, or a network usage history. At 708, the generating is based at least in part on the received location of the telecommunication device. The service preferences may include different fees respectively associated with different levels of usage of a network connectivity associated with the network operator. Also or instead, the service preferences may include preferences between the network operator and one of the other network operators or preferences between at least two of the other network operators. Further, the service preferences may prioritize at least one of connection performance, cost, power consumption, bandwidth, packet delivery efficiency, security level, coverage, and user experience.

At 710, the network operator provides the service preferences to the telecommunication device to enable the telecommunication device to select a network connectivity from a plurality of network connectivities based at least in part on the service preferences. The plurality of network connectivities may be respectively associated with the network operator and one or more other network operators. At 712, the service preferences are provided responsive to request from the telecommunication device or are provided automatically.

At 714, the network operator, generates updated service preferences. At 716, generating the updated service preferences comprises generating the updated service preferences based at least in part on network usage at a location of the telecommunication device. At 718, generating the updated service preferences comprises generating the updated service preferences based at least in part on a user request or a user change to the provided service preferences.

At 720, the network operator provides the updated service preferences to the telecommunication device.

FIG. 8 illustrates an example process of a service broker for generating service preferences for a telecommunication device based on input from network operators and providing the service preferences to the telecommunication device to enable the telecommunication device to intelligently select network connectivities to use for transmission of network packets. The process includes, at 802, providing, by a service broker, an open SIM to a user of a telecommunication device. At 804, the service broker may also provide a packet routing module to the telecommunication device. The service broker enables access to the network connectivities of a plurality of network operators.

At 806, the service broker receives at least one of service policies, indications of network conditions, usage histories, or service fees from the plurality of network operators. At 808, the service broker receives the service policies, the indications of network conditions, the usage histories, or the service fees as service preferences specified by each of the plurality of network operators.

At 810, the service broker generates service preferences for the telecommunication device based at least in part on the service policies, the indications of network conditions, the usage histories, or the service fees. The generating may comprise aggregating the service preferences of the network operators. The service preferences may include preferences between at least two of the network operators. Also, the service preferences may prioritize at least one of connection performance, cost, power consumption, bandwidth, packet delivery efficiency, security level, coverage, and user experience.

At 812, the service broker provides the service preferences to the telecommunication device to enable the telecommunication device to select a network connectivity from a plurality of network connectivities based at least in part on the service preferences. The plurality of network connectivities may be respectively associated with the plurality of network operators. At 814, the service preferences are provided responsive to a request from the telecommunication device or are provided automatically.

FIG. 9 illustrates an example process of a management service for generating service preferences for a telecommunication device and providing the service preferences to the telecommunication device to manage intelligent selection by the telecommunication device of network connectivities to use for transmission of network packets. The process includes, at 902, receiving from a subscriber, by a management service, a subscription for management of the telecommunication device through service preferences. At 904, the management service identifies a telecommunication device associated with the subscriber.

At 906, the management service generates service preferences for the telecommunication device based at least in part on a policy of the subscriber. At 908, the service preferences include a policy to be enforced by a packet routing module of the telecommunication device.

At 910, the management service provides the service preferences to the telecommunication device to enable the telecommunication device to select a network connectivity from a plurality of network connectivities based at least in part on the service preferences. The plurality of network connectivities may be respectively associated with a plurality of network operators.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
generating, by one or more computing devices, service preferences for a telecommunication device, wherein the service preferences are associated with at least a first packet-based cellular network corresponding to a first network operator and a second packet-based cellular network corresponding to a second network operator, the service preferences including different fees respectively associated with different levels of usage of at least the first packet-based cellular network and being based at least in part on:
a first set of one or more network conditions associated with the first network operator and a second set of one or more network conditions associated with the second network operator;
a first network operator policy associated with the first network operator and a second network operator policy associated with the second network operator; or
a first network usage history associated with the first network operator and a second network usage history associated with the second network operator;
associating the service preferences with an open subscriber identity module (SIM) that includes at least first authentication information for authenticating the telecommunication device with respect to the first network operator to enable access to the first packet-based cellular network and second authentication information for authenticating the telecommunication device with respect to the second network operator to enable access to the second packet-based cellular network; and
providing, by the one or more computing devices, the service preferences to the telecommunication device to enable the telecommunication device to select between the first packet-based cellular network corresponding to the first network operator and the second packet-based cellular network corresponding to the second network operator based at least in part on the service preferences,
wherein the first network operator operates a first telecommunication infrastructure that includes at least one first access network and a first core network, and the second network operator operates a second telecommunication infrastructure that includes at least one second access network and a second core network, the first telecommunication infrastructure being separate and distinct from the second telecommunication infrastructure, and
wherein both the first packet-based cellular network and the second packet-based cellular network are available for selection by the telecommunication device at a same time.

2. The computer-implemented method of claim 1, further comprising generating updated service preferences and providing the updated service preferences to the telecommunication device.

3. The computer-implemented method of claim 2, wherein generating the updated service preferences comprises generating the updated service preferences based at least in part on network usage at a location of the telecommunication device.

4. The computer-implemented method of claim 2, wherein generating the updated service preferences comprises generating the updated service preferences based at least in part on a user request or a user change to the service preferences.

5. The computer-implemented method of claim 2, wherein generating the updated service preferences comprises generating the updated service preferences in response to a user change to the service preferences.

6. The computer-implemented method of claim 1, further comprising receiving a location of the telecommunication device and performing the generating of the service preferences based at least in part on the location.

7. The computer-implemented method of claim 1, wherein the service preferences include preferences between the first network operator and the second network operator.

8. The computer-implemented method of claim 1, wherein the service preferences prioritize at least one of connection performance, cost, power consumption, bandwidth, packet delivery efficiency, security level, coverage, or user experience.

9. The computer-implemented method of claim 1, wherein a user of the telecommunication device does not have a set-term service contract with the first network operator.

10. The computer-implemented method of claim 1, wherein the service preferences are provided responsive to a request from the telecommunication device or are provided automatically.

11. The computer-implemented method of claim 1, further comprising providing the open SIM to the telecommunication device in response to the one or more computing devices receiving a subscription request from the telecommunication device for services provided by the one or more computing devices.

12. The computer-implemented method of claim 1, wherein the first network operator is associated with a first set of packet-based cellular networks and the second network operator is associated with a second set of packet-based cellular networks, the first set of packet-based cellular networks including at least one packet-based cellular network that is not included in the second set of packet-based cellular networks.

13. One or more non-transitory computer-readable media having stored thereon a plurality of programming instructions which, when executed by one or more computing devices, perform operations comprising:
receiving, from at least a first network operator and a second network operator, service preferences that include at least one of service policies, indications of network conditions, usage histories, or service fees, wherein the first network operator operates a first telecommunication infrastructure that includes at least one first access network and a first core network and the second network operator operates a separate second telecommunication infrastructure that includes at least one second access network and a second core network;
generating telecommunication device service preferences for a telecommunication device based at least in part on the service policies, the indications of network conditions, the usage histories, or the service fees, wherein generating the telecommunication device service preferences comprises aggregating the service preferences received from the first network operator and the second network operator; and
providing the telecommunication device service preferences to the telecommunication device to enable the telecommunication device to select between a first cellular network corresponding to the first network operator and a second cellular network corresponding to the second network operator based at least in part on the telecommunication device service preferences and authentication information provided by an open subscriber identity module (SIM) configured to enable authentication of the telecommunication device with respect to each of the first network operator and the second network operator,
wherein the one or more computing devices are remote from the telecommunication device and are connected to the telecommunication device via at least one of the first cellular network or the second cellular network.

14. The one or more non-transitory computer-readable media of claim 13, wherein the one or more computing devices are associated with a service broker that enables the telecommunication device to access the first cellular network of the first network operator and the second cellular network of the second network operator.

15. The one or more non-transitory computer-readable media of claim 13, wherein the operations further comprise providing the open subscriber identity module (SIM) to a user of the telecommunication device.

16. The one or more non-transitory computer-readable media of claim 13, wherein the operations further comprise providing a packet routing module to the telecommunication device.

17. The one or more non-transitory computer-readable media of claim 13, wherein the telecommunication device service preferences include preferences between the first network operator and the second network operator.

18. The one or more non-transitory computer-readable media of claim 13, wherein the telecommunication device service preferences prioritize at least one of connection performance, cost, power consumption, bandwidth, packet delivery efficiency, security level, coverage, and user experience.

19. The one or more non-transitory computer-readable media of claim 13, wherein the telecommunication device service preferences are provided responsive to a request from the telecommunication device or are provided automatically.

20. A telecommunication device comprising:
one or more processors;
memory coupled to the one or more processors;
a service preferences interface stored in the memory and configured to be operated by the one or more processors to:
receive service preferences, for the telecommunication device, that are based at least in part on a policy of a subscriber associated with the telecommunication device, the service preferences to enable the telecommunication device to select a network connectivity from a plurality of network connectivities based at least in part on the service preferences, the plurality of network connectivities being respectively associated with a plurality of network operators; and
a packet routing module stored in the memory and configured to be operated by the one or more processors to:
store, in at least one queue, a plurality of network packets that are received from a plurality of applications operating on the telecommunication device;
collect, for individual network packets of the plurality of network packets, network packets attributes; and select, for the individual network packets, individual network connectivities of the plurality of network connectivities based at least partially on the network packets attributes corresponding to the individual network packets and the service preferences, wherein each of the plurality of network operators operates a telecommunication infrastructure that includes access networks and a core network, and the telecommunication infrastructure of the plurality of network operators are separate and distinct from each other, and wherein at least two of the individual network connectivities are available for selection by the telecommunication device at a same time, the at least two of the individual network connectivities each being associated with a different one of the plurality of network operators.

21. The telecommunication device of claim 20, wherein the service preferences each include a policy to be enforced by the packet routing module of the telecommunication device.

22. The telecommunication device of claim 20, wherein the subscriber subscribes to a service for managing the telecommunication device through the service preferences.

\* \* \* \* \*